INVENTOR
ROBERT F. ELFANT

BY John E. Dougherty Jr.
ATTORNEY

United States Patent Office 3,432,812
Patented Mar. 11, 1969

3,432,812

MEMORY SYSTEM

Robert F. Elfant, Yorktown Heights, N.Y., assignor to International Business Machines Corporation, Armonk, N.Y., a corporation of New York Filed July 15, 1966, Ser. No. 565,439
U.S. Cl. 340—172.5 15 Claims
Int. Cl. G11b 13/00

ABSTRACT OF THE DISCLOSURE

A 2½D memory system is disclosed including circuitry which allows the memory to operate when some of the memory positions are inoperative. Each column of the memory includes seven word locations and seven operable status indicators. When the memory is addressed, the operable status indicators are first interrogated for the addressed column and the outputs are applied to an address modification circuit. The input address specifies the sequential word location in the particular column which is to be addressed. The address modification circuit provides an output address specifying the proper sequential word location counting only the operable word locations in the particular column. The functional operation is then carried out at that word location.

Figure 1:
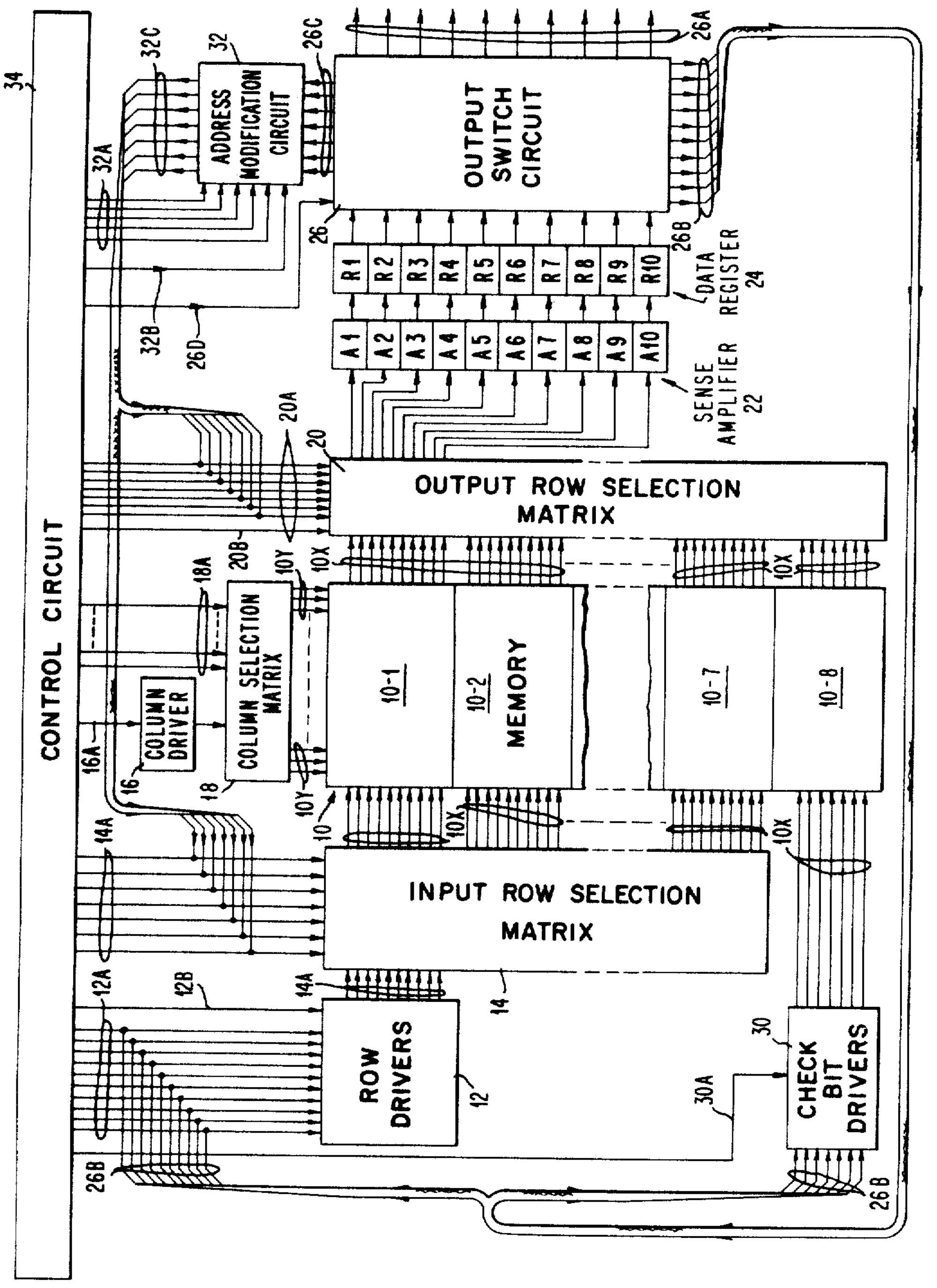

The present invention relates to memory systems and more particularly to improved memory systems of the type which can be operated when a number of the storage elements throughout the memory are not functioning properly.

The great majority of memories in commercial use are magnetic memories which include a number of word storage locations each identified by a particular address. In most of these memories, when one or more of the word locations include inoperative storage elements, no provision is made for operating the memory in a normal manner, that is without prohibiting the use of certain addresses to the programmer. Some memories have been developed which include a provision for identifying word locations including inoperative storage elements, and for operating these memories without the need for restrictions on the machine program. However, the memories thus far developed which include this capability require the use of rather extensive circuitry additional to that which is needed for normal operation of the memory. Further as the size of memories increases this problem of efficiently and economically providing circuits for operating a memory without program restrictions when the memory includes faulty storage elements becomes more acute.

This problem is further complicated when the memory is fabricated out of bulk type storage elements such as ferrite tubes or magnetic thin film sheets rather than discrete storage elements such as magnetic cores. Storage elements of the latter type can be tested individually before wiring in an array so that faulty elements can then be discarded. Some elements which pass this initial test can become inoperative as the result of damage to the core during assembly of the array or as the result of repeated use in the array and the principles of present invention are applicable in operating memories including inoperative discrete elements of this type. However, the invention is believed to have even greater application in very large memories which use bulk type storage elements. In the fabrication of such elements integrated structures each including a large number of storage elements are fabricated at one time. Most fabrication procedures are such that even though a high over-all yield of storage devices is attained, many of the integrated structures include one or more faulty storage devices. The economies of large scale memories are such that it is necessary to use structures which include some faulty storage positions in the memory. Of course, as with discrete elements some of the storage devices in the bulk structure which are operative when fabricated can be rendered inoperative by subsequent fabrication steps or repeated use. Bulk type memories will normally include a greater number of faulty storage positions than memories made of discrete elements. Further these faulty storage positions are distributed throughout the memories and each memory may include faulty storage positions at different locations in the memory. Present day computer utilization requires that the programmer be free to prepare programs for machines using these memories without being prohibited from using certain storage locations and that these programs be usable on different machines which include memories having faulty storage elements at different locations in the memory.

It is, therefore, a principal object of the present invention to provide an improved and economical memory system which can be operated without change in program addresses for the system even though the memory includes a number of faulty storage elements at random locations in the memory.

This object and other objects set forth below are realized in accordance with the principles of the present invention by providing a memory system which includes a plurality of word locations each including a group of storage devices and a further group of status indicator storage devices which indicate the operable status of the word locations. In response to each input word address for a functional operation the memory is operated to first determine the operable status of that word location as well as other word locations which precede and succeed the addressed location in an ordered sequence of addresses for the memory. An address modification circuit is provided which, in response to the input word address and the operable status information, provides modified addresses in the ordered sequence of addresses. The memory is then controlled to carry out the desired functional operation at the address provided by the address modification circuitry.

When the memory system employs a destructive type read operation, each memory cycle includes the above described address test and modification operation, a read operation and then a write operation at the word location specified by the address provided by the address modification operation. The information read out of the status indicator storage elements is rewritten during the readout operation at the word location. In a nondestructive memory no rewriting is necessary. Since the status indicator storage elements are read out at a different time than the storage elements at the word locations the same set of sense amplifiers can be used for both operations. Further the address modification circuit is a high speed circuit, operating in a small fraction of a memory cycle, so that the actual address modification has little effect on the time required for a complete memory cycle. At the same time since the address modification circuit responds to the inputs applied thereto to provide addresses in an ordered sequence, the circuitry required is relatively inexpensive.

Therefore, it becomes another object of the present invention to provide an improved memory system which is capable of operating with faulty storage positions, and which requires a minimum of additional circuitry and components.

It is a further object of the present invention to provide a system of the above type which can be operated with each memory cycle taking the same predictable time.

The foregoing and other objects, features and advantages of the invention will be apparent from the following more particular description of preferred embodiments of the invention, as illustrated in the accompanying drawings.

In the drawings:

FIG. 1 is a block diagram of the embodiment of the memory system of the present invention.

Figure 2C:
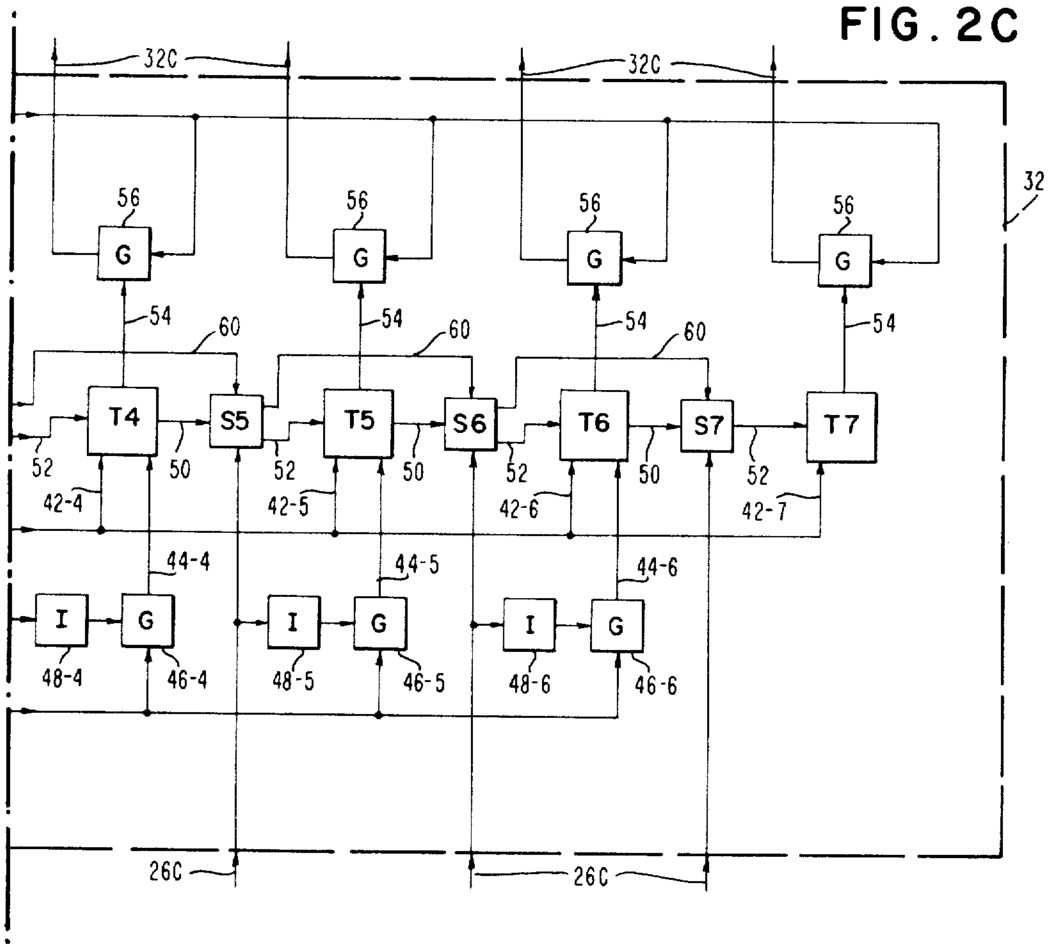
Figure 2:
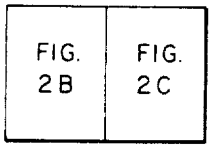
Figure 2B:
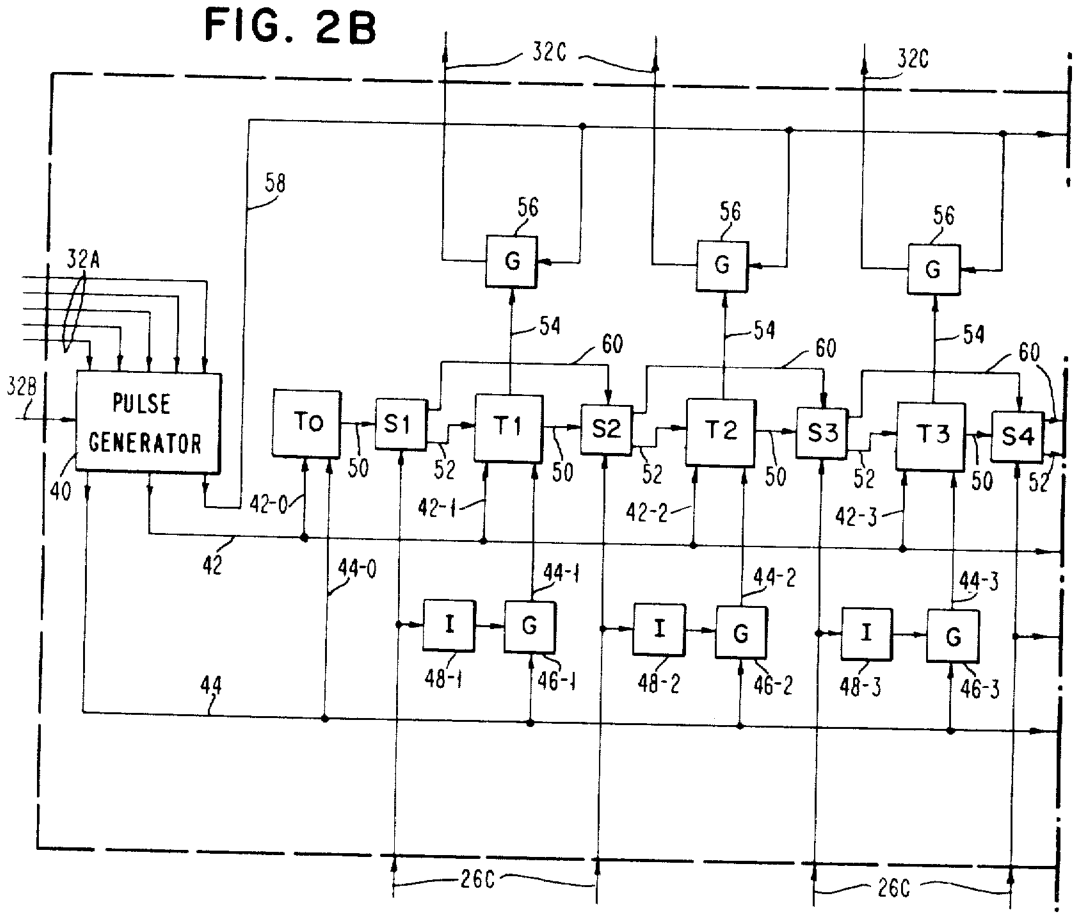
Figure 2A:
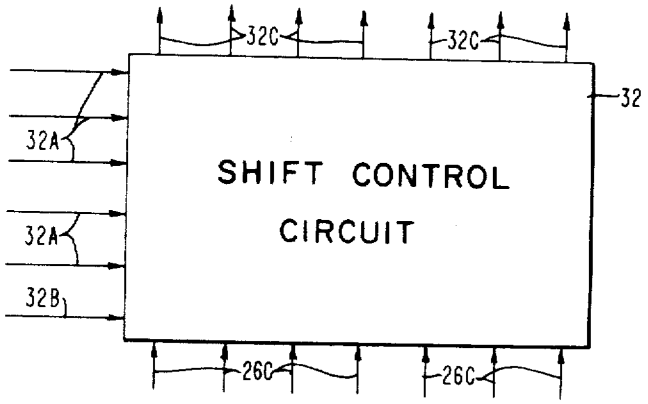

FIGS. 2B and 2C taken together as shown in FIG. 2 show more details of the address modification circuit which is illustrated in block form in FIG. 2A and in this form is incorporated into the block diagram of FIG. 1.

In the block diagram of FIG. 1 of an embodiment of the invention, there are twelve block representations of the principal functional units of the system. The central unit of the system is the memory represented by block 10. The memory 10 is made up of vertical columns and horizontal rows of bistable storage elements arranged in a coordinate array. These storage elements are addressed for read and write operations and readout signals are produced using two sets of lines 10X and 10Y. Lines 10Y extend vertically through the memory with each line being coupled to all of the storage elements in a corresponding column of the array. The lines in the other set 10X extend horizontally through the array with each of these lines being coupled to all of the storage elements in a corresponding row of the array. The storage elements of the array may be conventional type toroidal magnetic cores, but since the object of the invention is to allow for operation of a memory which includes a number of inoperative storage elements, and this problem is encountered in its severest form in the fabrication of very large scale bulk type memories, the practice of the invention is not limited to core memories. Specifically, the memory may be fabricated of continuous tubular cylinders of magnetic material each of which includes a large number of storage elements or magnetic thin film planes which are fabricated as integrated units that include a large number of storage elements in each plane.

The memory 10 of the embodiment of FIG. 1 is a 2½D memory. This term is used to distinguish the memory from conventional two dimensional (2D) and three dimensional (3D) memories. In a 3D memory there are three separate sets of address lines and each storage element in the array has associated with it a different combination of three lines, one from each of the three groups. In a 2D array there are two groups of address lines and each storage element is controlled by a different combination of two lines, one from each of these groups. In a 2½D array the physical arrangement of the array is similar to that of a conventional 2D array in that only two sets of lines are employed, but the mode of operation is different in that both reading and writing of words of information is accomplished by half select type of operation, and gating circuitry is provided at the input and output of the array to allow the memory to be operated using a minimum number of input row and column drive circuits and output sense amplifiers.

More specifically, in the system of FIG. 1 the block 12 represents the row drivers and, the block 14 represents the input row sections matrix which gates the signals supplied by the row drivers to a selected group of the row drive lines 10X. The block 16 represents the column driver and the block 18 the column selection matrix which gates the signals from this driver to selected ones of the column drive lines 10Y. Output signals are developed during a readout operation on the row lines 10X, which serve both as drive lines and sense conductors. An output row selection matrix 20 gates the output signals from selected lines 10X to a group of sense amplifiers generally designated 22 and including ten amplifier positions A1 through A10. The sense amplifiers are connected to a data register 24 including ten positions R1 through R10 and the output lines of this register are coupled to an output switch designated 26. This switch is controlled to selectively direct the amplified outputs from the memories to three sets of lines 26A, 26B and 26C. Lines 26A, of which there are ten, carry these outputs to the remaining portions of the system in which the memory is used. There are ten output lines 26B and these lines are directed back to input lines 12A for row drivers 12. Seven of these lines 26B are also connected to another set of what are called check bit drivers represented by a block 30. There are seven of the output lines 26C from output switch 26 which are connected as inputs to an address modification cricuit 32. The outputs of this circuit are developed on lines 32C which are connected to input lines 14A and 20A of the input and output row selection matrices 14 and 20. The signals for controlling the operation of the memory system are supplied to the various functional units by a control circuit 34.

The general organization and operation of the memory system shown in FIG. 1 is largely that of a conventional 2½D memory. In order to place the invention in proper perspective, in the description given below the conventional aspects of the memory system are first described and thereafter the mode of operation employing the check bit drivers 30, the address modification circuit 32 and certain storage positions in a portion 10–8 of the memory, and the control of these components which provide the ability to operate with inoperative storage positions.

The memory 10 is divided into eight portions which are numbered 10–1 through 10–8. The eighth portion designated 10–8 is employed as part of the structure for allowing operation of the memory when it includes inoperative storage positions and for the moment is not to be discussed. The seven portions of the memory 10–1 through 10–7 include along each vertical column seventy storage positions divided into seven groups with ten storage positions in each group. The word length for the memory of this embodiment is ten binary positions and thus it can be seen that there are seven word storage locations each including ten bits along each vertical column of the memory 10. The number of storage positions along each row may vary and only three drive lines 10Y at each end of the array are shown. Assuming that there are twenty such drive lines and twenty columns in the memory, the memory is capable of storing 140 words with each word including ten bits. It is of course obvious that bulk memories of the type to which this invention principally relates usually contain many more word locations and many more storage positions per word. The embodiment of FIG. 1 with the relatively small number of word locations and storage positions is shown as an illustration of the invention since the principles of operation as they relate to the invention are the same for this smaller memory as they would be for a larger memory. Therefore, this simplification in the number of storage positions shown is only to avoid overcomplicating the drawing with more connections which would not in anyway clarify the explanation of the inventive principles.

Reading and writing operations in the memory 10 are carried out at each word location. During each such operation the location of the word to be operated upon is determined by which of the column drive lines is energized and which of the groups of row drive lines 10X is energized. There is one group of ten such lines for each of the seven portions 10–1 through 10–7 of the memory array. This selection is under the control of the column selection matrix 18 and input and output row selection matrices 14 and 20 which are in turn controlled by signals applied to input lines 18A, 14A and 20A. In conventional 2½ operation of the memory the signals applied to these input lines represent the input address for the memory cycle. These address signals are supplied by control circuit 34. Let it be assumed that the memory cycle is to be performed in the first column of the memory and that the memory cycle as is usual includes a read operation and a write operation. The particular portion of the first column of the memory from which the word is to be read out is determined by the application of address signals to the lines 14A, which cause the row selection matrix to select for the read operation the appropriate group of row lines 10X. The readout signals are supplied by row drivers 12 and are gated through matrix 14 to the selected memory section. A line 12B activates the row drivers in response to a signal received from control circuit 34 to deliver the readout signals to row selection matrix 14. If it is assumed that the lines 10X for the memory portion 10–1 are selected, half select readout signals are applied to these row lines. These signals are of a polarity to switch each of the cores to which they are applied to their binary zero state, but are not effective of and by themselves to change the stable state of the cores. However, in first column of the memory and in portion 10–1 of that column after the row lines 10X are energized a similar half select signal is applied to column drive line 10Y. Thus, coincident signals are applied to the ten memory cores in that word location and each core which is in its binary one state is shifted to the binary zero state. Since only two lines are associated with each core and lines 10X serve both as drive and sense lines, during a readout operation lines 10X are energized first and the selected line 10Y is then energized causing a signal to be induced on each line 10X in the selected word location which is coupled to a core storing a binary one.

During a write operation the input row selection matrix 14 and column selection matrix are controlled in the same way. However column driver 16 then delivers a half select pulse of opposite polarity. Row drivers 12 supply signals only to the lines for the rows in which binary ones are to be written, these signals being half select signals of a polarity opposite to those delivered during a read operation.

During a readout operation signals are delivered by control circuit 34 to lines 20A to cause the output row selection matrix to be connected to the selected group of row lines 10X. The output signals which are developed on the lines 10X associated with selected portion of the memory pass through the output matrix 20 and are applied as inputs to the ten sense amplifiers A1 through A10. Here these signals are amplified and delivered to the data register 24. In a conventional operation of a 2½D memory the information word read out of the memory to the data register 24 is transmitted from this register through the output circuit 26 to the lines 26A which transmit the word to the other operational units of the system. The readout operation, as described, is a destructive type of operation, that is the readout of the word destroys the information stored in the addressed word location. The output lines 26B from output switch 26 carry this information back to the lines 12A which serve as inputs to the row drivers 12 and a writing operation of the type described above is carried out to rewrite the information back into the memory 10.

The operation of the memory as described up to this point is that of a conventional 2½D memory with seven word portions 10–1 through 10–7 in which all of the bit storage positions are assumed to be operating properly. However, in the fabrication of large scale memories some of the memory positions are found after testing not to operate properly. Further, it is also possible that certain of the memory positions which are initially operative become inoperative after use in actual operation. Since repair of these memories even where elements such as cores are used is difficult and where integrated or bulk type of devices are employed is even more difficult, the advantages of being able to operate such memories when they include inoperative storage elements is apparent. In the embodiment of FIG. 1 portion 10–8 is used not to store information words but rather to store indications as to whether or not all of the storage positions in each word of the memory are properly operative. Therefore, portion 10–8 of the memory includes one storage element for each word location in the memory and there are seven storage elements in each vertical column of portion 10–8 of the memory. These storage elements are called status indicator storage elements and indicate by their binary state the operable status of the word locations in the memory. The memory is tested after fabrication or during use to determine if the storage elements for the various word locations are operative. If the word is operative, the corresponding storage elements in portion 10–8 is set in its binary zero state. If on the other hand any one or more of the storage elements in any word locations is inoperative, the corresponding storage element in portion 10–8 of the memory is set to the binary one storage state. With this information stored in portion 10–8 of the memory each time a write or read operation is to be carried out, the memory is first interrogated to determine if the storage location which is to be addressed is completely operative.

More specifically, the memory 10 is addressed by specifying the particular column to be addressed and the particular word location (first, second, third, etc.) in that column. When any such address, such as for example an address specifying the third word location in column one is applied to the memory, the circuitry provided is effective to determine the third operative word location in that column automatically. Thus, if the second word location in the first column is inoperative (portion 10–2 of the memory) and the memory is addressed for the second word location in the first column, the circuitry automatically causes the read or write operation to be carried out in the second operative word location in this column which would be, of course, the third word location. Similarly, if the third location were addressed, again assuming the second word location to be an inoperative, the fourth word location is selected automatically for the functional operation to be performed. In order to allow provision for inoperative word locations, or more specifically, word locations which include inoperative bits, the memory of FIG. 1 actually uses at any one time only five of the word locations in any column. The two other locations are provided as spares to be substituted if any one of the other word locations is inoperative. If more than two word locations in any column become inoperative, other circuitry must be provided to change addresses. However, the design is such that sufficient substitute word locations are provided in each section or column of the memory to make this possibility remote.

The operation of the memory to perform a conventional normal memory cycle of the memory system of FIG. 1 includes three functional operations. First an address test and modification operation, then a read operation and finally a write operation. The first step in the address test and modification operation is to apply a signal via line 30A to the check bit drivers 30. This signal is supplied by the control circuit 34. The check bit drivers then apply half select read signals to the seven row lines 10X for portion 10–8 of the memory. A half select signal is then supplied by column drive 16 through column selection matrix 18 to the column drive line 10X for the column in which the operation is to take place. These half select signals are of the same polarity as are used during a normal write operation in a word location of the array, that is they are in a direction which would be effective in portions 10–1 through 10–7 of the memory to shift a core from the binary zero to the binary one state. In order to obtain the proper readout signal from portion 10–8, the remanent orientation of the cores for the binary one and zero states are opposite to those for the other seven portions of the memory. Thus, half select pulses are applied by the check bit drivers to the associated lines 10X and then a half select pulse applied to a selected one of the drive lines 10Y, the latter half select signal when applied producing on the lines 10X outputs indicating the storage state of the cores in the portion 10–8 of the memory for the column in which the reading or writing operation is to take place. A binary one representing signal on the lines 10X at this time indicates a faulty or inoperative word storage location and a binary zero signal indicates a properly functioning storage location. These signals on the lines 10X associated with portion 10–8 of the memory are applied to the output row selection matrix 20 which at this time is controlled by a signal applied to its input line 20B by control circuit 34 to gate the signals to the upper seven sense amplifiers A1 through A7. The amplified signals representing binary ones and zeros are then fed to the data register 24 and to the output switch circuit 26, and through this switch by lines 26C to the address modification circuit 32 under control of a signal applied by control circuit 34 to an input line 26D for the output switch circuit 26.

Control circuit 34 applies to a selected one of five input lines 32A for address modification circuit 32 an address signal indicating which word location in the selected column of the memory is to be operated upon. The address modification circuit, which is described in detail below with specific reference to FIGS. 2B and 2C, is then activated by a pulse applied to another input of the circuit designated 32B to determine which of the word locations is to be actually operated on. If all of the first five word locations in the selected column are operative and this information is fed into circuit 32 by lines 26C, an output is generated by the circuit to indicate that the functional operation is to be performed in the actual word location addressed. Thus, if the address calls for an operation in the second word location in the column, circuit 32 provides an output on an appropriate one of a set of output lines 32C to cause the second physical word location in the ordered sequence in the selected column to be addressed. If one or more of the word locations are inoperative, the address modification circuit in response to this information supplied on lines 26C generates an output on lines 32C to cause the correct storage location in the ordered sequence, that is the second operative location for the example being considered to be actually addressed. The lines 32C are connected both to the lines 20A which control the output row selection matrix 20 and the lines 14A which control the input row selection matrix 14A. The signals applied by lines 32C control matrices 14 and 20 to select the proper row lines 10X for the functional read and write operations to be performed.

From the above it can be seen that the portion of the input address, which specifies the word location in the addressed column or section of the memory to be operated upon, is not fed directly to the input and output matrices 14 and 20 but rather to the address modification circuit 32. This information and the information developed during the readout operation of portion 10–8 of the memory, which is also applied as an input to circuit 32, determines the actual address of the word location for the functional read and write operations.

With these signals applied to the inputs of these two matrices, row drivers 12 are then activated to apply proper half select read pulses to the addressed row lines. After the application of these half select pulses but before their termination, the selected column drive line 10Y is also energized with a half select read signal causing the selected word location to be interrogated and produce outputs on lines 10X which are transmitted through matrix 20 and sense amplifier 22 to data register 24. During this second operation of the memory cycle which is an information readout operation, the information read out of the operable status indicator storage elements of portion 10–8 of the memory during the prior address test and modification operation is rewritten in this portion of the memory. This information is fed back after the first readout operation by seven of the lines 26B to check bit drivers 30. These drivers under control of the information signals on lines 26B apply signals to the row lines 10X associated with portion 10–8 in the memory at the same time as the selected memory word location is being interrogated. Though during the second operation the memory cycle, the addressed word location is being interrogated, the operation in portion 10–8 is a write operation rather than a read operation. It is for this reason that the flux orientation for a binary one and zero in the storage elements of portion 10–8 is opposite to that for the other seven portions of the memory.

The last of the three operations performed during a normal memory cycle is a write operation in which either the information word previously read out is rewritten or a new word is entered into the memory. In the former case the signals representing the word to be rewritten are transmitted from output switch circuit 26 on lines 26B to the input lines 12A for the row drivers 12. At the same time the row address information specifying the position of the memory in which the write operation is to take place is transmitted from address modification circuit 32 on lines 32C to the input lines 14A of the input row circuit matrix 14. The write operation is then carried out as indicated above by activating column driver 16 to apply a signal to the selected column line 10Y and actuating row drivers 12 to apply the information representing signals to input matrix 14.

The writing operation is essentially the same when a new word is to be entered in the memory differing only in that information signals are then transmitted from control circuit 34 directly to the input lines 12A for the row drivers 12.

The polarity of the signal applied to the selected column drive line 10Y for the last described write operation in portion 10–1 through 10–7 of the memory is the same as the signal applied during the first operation of the memory cycle during which the check bits for the addressed column are read out of the memory. It is possible when two successive read/write operations are performed in the same column of the memory that the first operation of the second memory cycle, that is the address test and modification operation be carried out simultaneously with the last operation of the first memory cycle during which a word is written in the selected portion of the column addressed.

The circuits for the address modification function are shown in FIGS. 2B and 2C. FIG. 2 illustrates the manner in which FIGS. 2B and 2C are placed together to provide a complete circuit. The block diagram of FIG. 2A provides a correlation between the block 32 as used in FIG. 1 and the connections and detailed circuitry of FIGS. 2B and 2C. As was pointed out during the description of FIG. 1, the outputs from portion 10–8 of the memory indicating the operable status of the seven word locations in the columns addressed are applied as inputs to lines 26C. The other input to circuit 32 is the input word location address applied by lines 32A. The function of the address modification is to provide when necessary modified addresses in an ordered sequence in response to these inputs indicating the operable status of the word location specified by the input address as well as the status of the other preceding and succeeding locations in the addressed column. The seven lines 26C as shown in FIGS. 2B and 2C, are connected as inputs directly to seven switches represented by blocks designated S1 through S7. The blocks S1 through S7 are connected as part of a shift register made up of eight bistable storage devices or triggers designated T0 through T7. At the start of the first step of each memory cycle a signal is delivered by control circuit 34 of FIG. 1 to line 32B and applied by this line to a pulse generator 40 in FIG. 2B which provides the control pulses necessary to operate the address modification circuit. Pulse generator 40 first energizes a reset line 42 which is connected as an input to each of the eight triggers T0 through T7 of the shift register. The connections are such that trigger T0 is set to a binary one state and the remaining triggers are set to their binary zero states. The pulse generator then applies to shift line 44 a number of shift pulses determined by the address indicating which of the word locations in the selected column of the memory is to be operated upon. This information is supplied from the control circuit 34 to the lines 32A which are connected as inputs to pulse generator 40. Thus, if the first word in the column selected is to be operated upon, only one shift pulse is applied. If the fourth word is to be operated upon, four shift pulses are required. Since the operation of the system of FIG. 1 only envisions the use of five of the seven memory locations in any column, the maximum number of shift pulses supplied by pulse generator 40 is five.

If it is assumed that all of the memory locations are operable and there are binary zero representing signals on lines 26C as the result of the read out of the appropriate column of portion 10–8 of the memory of FIG. 1, switches S1 through S7 transmit the output from the previous trigger in the shift register directly to the next trigger in the register. Under these conditions with the register initially set with a one stored in trigger T0 and zeros in the remaining triggers T1 through T7, the first shift pulse transfers the one to the trigger T1 and all of the remaining triggers T0 and T2 through T7 are set to zero. This shift pulse is applied by line 44 to the shift input designated 44–0 for the first trigger directly and through gate circuits 46–1 through 46–7 to the shift inputs 44–1 through 44–6 of the other triggers with the exception of trigger T7 which does not require a shift input. Gates 46–1 through 46–6 are controlled by inverters 48–1 through 48–6 and each inverter is connected to a corresponding one of the lines 26C. Each of the gates 46–1 through 46–6 is normally closed and is opened to transmit signals from line 44 to the associated shift input line when a signal is applied by the inverter connected to the gate. These signals are applied when the line 26C to which the inverter is connected carries a binary zero representing signal.

All of the gates 46–1 through 46–6 are open to transmit signals to their associated shift input lines when all of the word locations in the selected column are operative. Since at this time all of the switches S1 through S7 transmit signals directly from the output 50 of the preceding trigger to the input 52 of the next succeeding trigger in the register, each shift pulse applied by pulse generator 40 shifts the binary one originally stored in trigger T0 one position to the right. At the end of the shift operation all of the triggers but the one corresponding to the number of shift pulses applied are in the binary zero state and the one trigger which represents the number of shift pulses applied is in a binary one state. Thus, if the third word in the selected column is addressed, the trigger T3 is in a binary one state and all of the remaining triggers are in a binary zero state. The outputs of these triggers are connected by lines 54 to gates 56. After the shifting operation is completed a signal is supplied by pulse generator 40 to a line 58 which is connected as an input to each of the gates 56. This signal is passed through the one of these gates which is associated with the trigger then in the binary one condition to produce an output on the corresponding one of the lines 32C. This output is fed back as is shown in FIG. 1 to control the addressing of the row lines during the subsequently performed read and write operations.

If there are one or more faulty or inoperative word locations in the selected column, binary one signals are applied to the corresponding lines 26C when portion 10–8 of the memory is interrogated. These signals are applied to the switches S1 through S7 and also to the inverters 48–1 through 48–6. The application of a binary one signal to any one of the switches S1 through S7 causes that switch to direct inputs applied from the preceding trigger by line 50 to an input 60 which is connected not to the next trigger in the shift register but to the next succeeding switch in the shift register. At the same time when a signal indicating an inoperative word location is applied to any one of the inverters 48–1 through 48–6 by the connected one of the lines 26C, the corresponding gate 46–1 through 46–6 is controlled so as not to pass the shift signals on line 44 to the shift input of the connected trigger.

To be more specific, if it is again assumed that the third word location in the selected column of the memory is addressed, pulse generator 40 is controlled to apply three shift pulses. If at the same time there is a binary one signal on the second from the left of the lines 26C indicating that the second word location in the selected column of the memory is inoperative, gate 46–2 does not apply shift signals to trigger T2 and switch S2 is controlled to transfer the inputs applied by its input line 50 to the input 60 for the next succeeding switch S3 rather than to the trigger T2. The effect of this arrangement from a circuit standpoint is to remove the trigger T2 from the shift register and after the application of the three advance pulses a binary one is stored in trigger T4. As a result when the signal is applied to line 58 by pulse generator 40, this signal is passed through the fourth gate 56 to address the fourth word location in portion 10–4 of the memory of FIG. 1, which is the third usable location in the addressed column. If there are two faulty positions, for example, assuming that both the first and the second word locations are inoperative, binary one signals are present on the first two of the lines 26C, thereby disabling both of the gates 46–1 and 46–2 from applying shift pulses to trigger T1 and T2. Both of the switches S1 and S2 at this time are controlled by these signals to transfer inputs applied to the output lines 60 for these switches rather than to output line 52. Thus, the output produced during the first shift operation, when the binary one is transferred from trigger T0, passes through switch S1 to the output line 60 to the switch S2. Since switch S2 is also being controlled by a binary one input on the connected one of the lines 26C, the binary one representing signal from trigger T0 is applied by the output line 60 of switch 52 as an input to trigger T3. Subsequent pulses applied to shift line 44 advance the binary one to the proper one of the triggers in the ordered sequence which corresponds to the word location in the array in which the read and write operation is to take place. With the first and second word location in the selected column inoperative and an address indicating that the third word location is to be operated upon, the three advance pulses applied to line 44 advance the binary one originally set in trigger T0 to the trigger T5 which corresponds under these conditions to the third operative word location in the selected column of the memory array.

The pulse generator 40 is operated to apply pulses to line 58 which are passed through the proper one of the gates 56 to the connected line 32C during both the second and third steps of each memory cycle. More specifically, an output is provided on the proper one of the lines 32C to control actual reading in the selected word location in the ordered sequence and subsequently to control writing in that location. Further, since these signals are transmitted during the initial parts of the reading and writing operations, it is possible, as stated above, when two successive memory cycles are to be performed in the same column of the array to read out portion 10–8 of the memory as the first operation for the second such memory cycle at the same time as the writing operation which is the third step of the first memory cycle is being performed.

In the embodiment of the invention described above the memory 10 of FIG. 1 is operated in such a way that memory cycles can be carried out in any column of the memory as long as five of the seven word locations in that column are operable, and this type of operation with faulty memory locations does not require any change in the external addresses applied to the memory by control circuit 34. In this type of operation each column of the memory can be considered to be a separate section which includes a number of word locations and additional storage elements which indicate the status of these word locations. The arrangement need not be so limited, that is each section of the memory can include more than one column or the arrangement can be such that the extra word locations in each column can be used as substitutes for faulty locations not only in that column but also in one or more columns. In this mode of operation portion 10–8 of the memory is larger and each column includes status indicator storage elements for not only the addressed column but for a larger section of the memory. The address modification circuit in this mode of operation requires more circuitry but as in the specific embodiment described provides outputs of actual addresses in an ordered sequence in response to the input address information and inputs indicating the operable status of the addressed section of the memory. Particular note should be made of the fact that in this type of operation a status indicator storage element may be set in its binary one state in one column, not because the corresponding word location is inoperative, but because that word location is being used as a substitute for an inoperative word location in a prior column. Further, the address modification circuit may include component circuits for shifting in an ordered sequence not only between word locations in the same column or section of the memory but from column to column. Since the circuit components used in the address modification circuit are high speed components which perform their function in a small fraction of the time required for a memory operation, the time required for address modification itself does not add to the memory cycle time even where more sophisticated embodiments are employed. The address modification does, however, require an extra memory operation during each memory cycle to read out the operable status storage elements but in very large scale bulk memories the operating requirements are such that the bulk memory can be used in conjunction with smaller high speed memories to achieve over-all high data processing rates.

While the invention has been particularly shown and described with reference to preferred embodiments thereof, it will be understood by those skilled in the art that various changes in form and details may be made therein without departing from the spirit and scope of the invention.

What is claimed is:

1. In a memory system:

(a) a plurality of storage elements arranged in columns and rows;

(b) each column of said memory being divided into a plurality of word locations with each word location including a group of storage elements for storing the information bits of an information word;

(c) each column of said memory also including a plurality of status indicator storage elements at least one for each of said word locations in that column;

(d) each of said status indicator storage elements storing an indication of whether or not the corresponding word location is operative;

(e) control circuits for initiating functional operations in said memory and for providing a column address specifying the particular column of said memory and a word location address specifying the particular word location in that column in which a functional operation is to be performed;

(f) the addresses for the word locations in each column being in an ordered sequence and each address for a word location indicating the numerical position of that word location in the ordered sequence;

(g) means coupled to said control circuit and responsive thereto when a functional operation is initiated in said memory for first reading out the information states of the status indicator storage elements in the addressed column of the memory and providing outputs indicating the operable status of each of the word locations in that column;

(h) address modification circuitry;

(i) means coupled to said memory and to said address modification circuitry for applying as a first input to said address modification circuitry said outputs indicating the operable status of the word locations in the addressed column;

(j) means coupled to said control circuit and said address modification circuitry for applying as a second input to said address modification circuitry the word location address indicating the numerical position of the word location in the addressed column in which the functional operation is to be performed;

(k) said address modification circuitry including means for providing an output in response to said first and second inputs specifying the actual address of the word location in the addressed column which corresponds to the position of the addressed word location in the sequence counting only the operable word locations in the addressed column;

(l) and means coupled to said control circuitry and said address modification circuitry for causing a functional operation to be carried out in said actual word location in the addressed column which corresponds to the sequential position of the original word location address counting only operable word locations in that column.

2. In a memory system:

(a) a plurality of storage elements arranged in rows and columns;

(b) a plurality of address lines for said memory at least one for each row and one for each column of said memory;

(c) each column of said memory including a plurality of word locations and each world location including a plurality of storage elements;

(d) each column of said memory also including a plurality of status indicator storage elements at least one for each of the word locations in that column and each storing an indication of whether or not the corresponding word location is operable;

(e) means for providing an address of a word location in said memory in which a memory cycle is to be performed, said address including a first part specifying the column which is to be addressed and a second part specifying the particular word location by number in an ordered sequence in the column which is to be addressed;

(f) control means for initiating a memory cycle in said memory and for first energizing with half select signals both the column drive line for the column addressed and the row drive lines for each of the status indicator storage elements in the column addressed to provide an output indicating which of the word locations in that column are operable and which are inoperable;

(g) an address modification circuit;

(h) means for applying to said address modification circuit the outputs indicating the operable status of the word locations in the addressed column and also the second part of said address specifying the particular word location by number in the ordered sequence which is to be addressed;

(i) said address modification circuit in response to said inputs providing an output indicating the actual word location in the addressed column which corresponds to the specified word location by number in the ordered sequence counting only operable word locations in that column;

(j) said control means then causing an information word to be read out of said memory by energizing with half select signals both the drive line for the column addressed and the row drive lines for each of the storage elements in the actual word location at the address specified by said address modification circuit.

3. The memory of claim 2 wherein said control means also causes the information indicating the operable status of said word locations to be rewritten in the status indicator storage elements in said addressed column by causing half select signals representing said information to be applied to the row drive lines for the status indicator storage elements at the same time as the column drive line is energized to read out the information word.

4. The memory of claim 2 wherein said memory system includes one group of sense amplifiers and said system includes means for coupling the outputs of said status indicator storage elements to said sense amplifiers during said first operation when these storage elements are read out and for subsequently coupling the outputs of the storage elements in the said actual word location to said sense amplifiers when these storage elements are read out.

5. In a memory system:
(a) a plurality of storage elements arranged in a number of different sections;
(b) each section of said memory being divided into a plurality of word locations with each word location including a group of storage elements for storing the information bits of an information word;
(c) each section of said memory also including a plurality of status indicator storage elements for the word locations in that section;
(d) each of said status indicator storage elements storing an indication of whether or not a corresponding word location is operative;
(e) control circuits for initiating functional operations in said memory and for providing addresses specifying the particular section of said memory and the particular word location in that section in which a functional operation is to be performed;
(f) means coupled to said control circuit and responsive thereto when a functional operation is initiated in said memory for first simultaneously reading out the status indicator storage elements in the addressed section of the memory and providing outputs indicating the operable status of each of the word locations in that section;
(g) address modification circuitry for providing modified word location addresses;
(h) means coupled to said memory and to said address modification circuitry for applying as a first input to said address modification circuitry said outputs indicating the operable status of the word locations in the addressed section of the memory;
(i) means coupled to said control circuit and said address modification circuitry for applying as a second input to said address modification circuitry the address of the word location in the addressed section of the memory in which the functional operation is to be performed;
(j) said address modification circuitry including means for changing the original word location address applied as the second input thereto by an amount determined by the operable status of the word locations in the addressed section applied as said first input thereto;
(k) and means coupled to said control circuitry and said address modification circuitry for carrying out a functional operation at the word location in the addressed column which is specified by said modified word location address.

6. In a memory system:
(a) a plurality of storage elements arranged in a number of different sections;
(b) each section of said memory being divided into a plurality of word locations with each word location including a group of storage elements for storing the information bits of an information word;
(c) a plurality of status indicator storage elements for said word locations in the section of said memory;
(d) each of said status indicator storage elements storing an indication of whether or not a corresponding word location is operative;
(e) a control circuit for initiating functional operation in said memory and for providing addresses specifying the particular section of said memory and the particular word locations in that section in which a functional operation is to be performed;
(f) means coupled to said control circuit and responsive thereto when a functional operation is initiated in said memory for first simultaneously reading out the status indicator storage elements corresponding to the word locations in at least the addressed section of the memory and providing outputs indicating the operable status of said word locations;
(g) an address modification circuit;
(h) means coupled to said memory and to said address modification circuit for applying as a first input to said address modification circuit said outputs indicating the operable status of said word locations;
(i) means coupled to said control circuit and said address modification circuit for applying as a second input to said address modification circuit the address of the word location in the addressed section of the memory in which the functional operation is to be performed;
(j) and said address modification circuit including means responsive to said first and second inputs for providing a modified word location address.

7. In a memory system:
(a) a plurality of word locations each including a plurality of storage elements for storing information words, each of said word locations having an address and the addresses being in an ordered sequence;
(b) a further plurality of storage elements for storing indications of the operable status of said word locations;
(c) a control circuit means for initiating functional operations in said memory system and for providing an address of a word location in which a functional operation is to be performed;
(d) means coupled to said control circuit means and said further plurality of storage elements for simultaneously interrogating a number of storage elements in said further plurality of storage elements to provide outputs indicative of the operable status of a number of said word locations including the addressed word location and word locations having addresses both preceding and succeeding the addressed word location in said ordered sequence;
(e) an address modification circuit;
(f) means coupled to said address modification circuit for applying as a first input thereto said outputs from said further plurality of storage elements indicating the operable status of said number of word locations including the addressed word location;
(g) and means coupled to said control circuit and said address modification circuit for applying as a second input to said address modification circuit the address for the word location in which the functional operation is to be performed.

8. In a memory system of the type including a plurality of word locations each having an address and each including a plurality of storage elements for storing information words which are written in said memory and read out of said memory at specified addresses under control of read write means connected to said memory, the improvement comprising in combination:
(a) said memory including a plurality of status indicator storage elements each storing an indication of the status of a corresponding one of said word locations;
(b) an address modification circuit for providing at an output thereof modified addresses for word locations in an ordered sequence in said memory;
(c) and means operable when an address of a word location is supplied to said memory for applying information specifying the addressed word location to said address modification circuit and for reading out the status indicator storage elements of said addressed word location and word location preceding and succeeding it in said ordered sequence and applying the information read out as an input to said address modification circuit;
(d) and means coupled to said address modification circuit for controlling said memory to operate upon the word location specified by the modified address provided by said address modification circuit.

9. The memory system of claim 8 wherein:

said memory is divided into columns and rows of storage elements;

each said column of storage elements including a plurality of word locations and the status indicator storage elements for the included word locations;

said input output means for said memory including a plurality of sense amplifiers equal in number to the number of storage elements in each word location;

and means for coupling said sense amplifiers to the outputs for the status indicator storage elements when the information in these elements is read out of said memory and for the coupling to said sense amplifiers the outputs for the storage elements in the word location specified by the address provided by said address modification circuit to read out the word stored at that address.

10. The memory of claim 8 wherein readout operations in said memory are destructive and said memory system includes means for writing in said status indicator storage elements the information previously read out of these elements at the same time that the storage elements in the word location specified by the modified address supplied by said address modification circuitry are being read out.

11. In a memory system:

(a) an array of storage elements;

(b) input-output means for said memory for writing information in said storage elements and reading out information previously written in said storage elements;

(c) said input-output means and said storage elements being coupled to divide said storage elements into a plurality of word locations each including a plurality of storage elements;

(d) said array of storage elements also including a plurality of status indicator storage elements for said word location in said memory, each of said status indicator storage elements storing an indication of the operable status of a corresponding one of said word locations in said memory;

(e) said input-output means for said memory including means coupled to said status indicator storage elements for reading and writing in these elements;

(f) each of said word locations in said memory having an address;

(g) control circuit means coupled to said input-output means for controlling memory cycles in said memory and for providing an address specifying a word location to be operated upon during each memory cycle;

(h) said control circuit means controlling said memory during each memory cycle to first undergo an address test and modification operation, then a read operation, and finally a write operation;

(i) an addressed modification circuit for providing addresses in an ordered sequence when inputs are applied thereto;

(j) said control circuit means controlling said input-output means during said first address test and modification operation to read out a number of said status indicator storage elements and provide outputs indicating the operable status of the addressed word location and a number of word locations having addresses preceding and succeeding the address of said addressed word location in said ordered sequence;

(k) means coupling the output means of said memory and said address modification circuit for applying as a first input to said address modification circuit said outputs indicating the operable status of the addressed word location and said number of word locations preceding and succeeding the addressed word location in said ordered sequence;

(l) means coupled to said control circuit and to said address modification circuit for applying as a second input to the address modification circuit the word location address for the memory cycle;

(m) said addressed modification circuit including means for modifying said address applied as a second input thereto in accordance with the operable status of said word locations applied as a first input thereto;

(n) and means coupling an output of said address modification circuit to said input-output means to cause the read and write operations of said memory cycle to be performed at the word location specified by the modified address supplied by said address modified circuit.

12. The memory system of claim 11 wherein said control circuit means controls said input-output means for said memory during said read operation to rewrite in the operable status indicator storage elements the information read out of said elements during said address test and modification operation.

13. The memory system of claim 11 wherein said storage elements are arranged in a coordinate array of columns and rows;

said inpt-output means includes a column line for each column of said memory and a row line for each row of said memory;

and each column of said memory includes the storage elements for a plurality of word locations and the status indicator elements for the word locations in that column.

14. The memory system of claim 13 wherein said input-output means include row and column drive circuits and row gating means for selectively coupling signals from said row drive circuits to said row lines and column gating means for selectively coupling signals from said column drive circuit to said column lines;

each said address of a word location in said memory including a column address and a word location address;

means coupling said control circuit to said column gating means for applying as an input to said column gating during each address test and modifications operation and each read operation of a memory cycle the column address supplied by said control circuit means for that memory cycle;

and said output of said address modification circuit being coupled as an input to said row gating means for applying said modified word location address as an input to said row gating means during each read and write operation of a memory cycle.

15. In a memory system:

(a) an array of storage elements;

(b) drive and sense line means for said memory for reading out information stored in said storage elements;

(c) said storage elements being divided into a plurality of word locations each including a plurality of storage elements;

(d) said array of storage elements also including a plurality of status indicator storage elements for said word locations in said memory, said status indicator storage elements storing indications of the operable status of said word locations in said memory;

(e) said drive and sense means for said memory including means coupled to said status indicator storage elements for reading out these elements;

(f) each of said word locations in said memory having an address;

(g) control circuit means coupled to said drive and sense means for controlling memory cycles in said memory and for providing an address specifying a word location to be operated upon during each memory cycle;

(h) said control circuit means controlling said memory during each memory cycle to first undergo an address test and modification operation;

(i) an addressed modification circuit for providing addresses in an ordered sequence when information inputs are applied thereto;

tor storage elements and provide outputs indicating the operable status of the addressed word location (j) said control circuit controlling said drive and sense means during said first address test and modification operation to read out a number of said status indica- and a number of word locations having addresses preceding and succeeding the address of said addressed word location in said ordered sequence;

(k) means coupling said sense means of said memory and said address modification circuit for applying as a first input to said address modification circuit said outputs indicating the operable status of the addressed word location and said number of word locations preceding and succeeding the addressed word location in said ordered sequence;

(l) means coupled to said control circuit and to said address modification circuit for applying as a second input to the address modification circuit the word location address for the memory cycle;

(m) said addressed modification circuit including means for modifying said address applied as said second input thereto in accordance with the operable status of said word locations applied as said first input thereto;

(n) and means coupling an output of said address modification circuit to said drive sense means to cause the read operation of said memory cycle to be performed at the word location specified by the modified address supplied by said address modified circuit.

References Cited

UNITED STATES PATENTS

| | | | |
|---|---|---|---|
| 3,222,653 | 12/1965 | Rice | 340—172.5 |
| 3,245,049 | 4/1966 | Sakalay | 340—172.5 |
| 3,311,890 | 3/1967 | Waaben | 340—172.5 |
| 3,331,058 | 7/1967 | Perkins | 340—172.5 |
| 3,336,579 | 8/1967 | Heymann | 340—172.5 |
| 3,350,690 | 10/1967 | Rice | 340—172.5 |

PAUL J. HENON, *Primary Examiner.*

RAULFE B. ZACHE, *Assistant Examiner.*